(12) United States Patent
Ene et al.

(10) Patent No.: US 12,229,744 B2
(45) Date of Patent: Feb. 18, 2025

(54) METHODS FOR AUGMENTED/VIRTUAL-REALITY TRANSACTION SYSTEMS FOR ENABLING RAPID TRANSACTIONS WITH DEFERRED PAYMENT OBLIGATION AND LIMITED USER INTERACTION

(71) Applicant: Supertab AG, Steinhausen (CH)

(72) Inventors: Cosmin-Gabriel Ene, Zollikon (CH); Marcel Erni, Steinhausen (CH); Jesse Knight, Scarborough, ME (US)

(73) Assignee: Supertab AG, Steinhausen (CH)

( * ) Notice: Subject to any disclaimer, the term of this patent is extended or adjusted under 35 U.S.C. 154(b) by 0 days.

(21) Appl. No.: 18/090,772

(22) Filed: Dec. 29, 2022

(65) Prior Publication Data
US 2023/0222479 A1 Jul. 13, 2023

Related U.S. Application Data

(60) Provisional application No. 63/295,239, filed on Dec. 30, 2021.

(51) Int. Cl.
*G06Q 20/24* (2012.01)
*G06F 3/04815* (2022.01)
(Continued)

(52) U.S. Cl.
CPC ......... *G06Q 20/24* (2013.01); *G06F 3/04815* (2013.01); *G06Q 20/321* (2020.05);
(Continued)

(58) Field of Classification Search
CPC ............................ G06Q 20/24; G06F 3/04815
See application file for complete search history.

(56) References Cited

U.S. PATENT DOCUMENTS

2016/0070439 A1* 3/2016 Bostick ................. G06F 3/0304
715/728
2019/0156404 A1* 5/2019 Gabriele ............ G06Q 30/0601
(Continued)

FOREIGN PATENT DOCUMENTS

JP 2019079439 A 5/2019

OTHER PUBLICATIONS

The Japanese Office Action, mailed on Nov. 30, 2023, in the related Japanese Appl. No. 2022-211452.

*Primary Examiner* — Edward Chang

(57) ABSTRACT

Methods for rapid micro-payment transactions with deferred payments employ a network-connected AR device ("HMD") having sensors for detecting a user's gaze/physical commands. Such methods comprise: receiving information from the HMD indicating a selected real-world/virtual content item for a potential transaction; causing the HMD to display a virtual transaction management widget ("TMW") showing the selected item's cost, maximum threshold amount before triggering settlement; and any prior unsettled payment obligations; receiving further information from the HMD confirming the potential transaction based on the user's gaze/physical command; transmitting an authorization signal to a merchant offering the selected item without concurrently requiring payment when the selected item's cost and prior unsettled payment are less than the maximum threshold amount; and transmitting a signal to a payment system for settlement of the balance when the selected item's cost and any unsettled payment are equal/greater than the maximum threshold; and updating the displayed TMW accordingly.

26 Claims, 6 Drawing Sheets

(51) Int. Cl.
    *G06Q 20/32*      (2012.01)
    *G06Q 20/40*      (2012.01)
    *G06Q 20/42*      (2012.01)
    *G06F 3/01*      (2006.01)

(52) U.S. Cl.
    CPC ............. *G06Q 20/40* (2013.01); *G06Q 20/42* (2013.01); *G06F 3/012* (2013.01); *G06F 3/013* (2013.01); *G06F 3/017* (2013.01)

(56) References Cited

U.S. PATENT DOCUMENTS

| | | |
|---|---|---|
| 2019/0205851 A1* | 7/2019 | Sinha ................... G06Q 20/321 |
| 2019/0370549 A1 | 12/2019 | Lai et al. |
| 2020/0293166 A1 | 9/2020 | Timonen et al. |
| 2021/0110460 A1 | 4/2021 | Barklow et al. |

* cited by examiner

METHODS FOR AUGMENTED/VIRTUAL-REALITY TRANSACTION SYSTEMS FOR ENABLING RAPID TRANSACTIONS WITH DEFERRED PAYMENT OBLIGATION AND LIMITED USER INTERACTION

CROSS-REFERENCE TO RELATED APPLICATIONS

This application claims priority from U.S. Provisional Patent Application No. 63/295,239, entitled "METHODS FOR AUGMENTED/VIRTUAL-REALITY TRANSACTION SYSTEMS FOR ENABLING RAPID TRANSACTIONS WITH DEFERRED PAYMENT OBLIGATION AND LIMITED USER INTERACTION" and filed on Dec. 30, 2021. U.S. Provisional Patent Application No. 63/295,239 is hereby incorporated by reference herein in its entirety.

BACKGROUND

Augmented and virtual reality systems have undergone substantial development over the last decade in particular, and are becoming a mainstay in the gaming world. FIG. 1 illustrates an exemplary head-mounted device (HMD) for augmented reality, as is described in U.S. Pat. No. 10,061,252 ("Distributed Augmented Reality System"), which issued on Aug. 28, 2018 and is hereby incorporated by reference in its entirety herein. FIG. 2 depicts the principal components in the HMD of FIG. 1. A variety of sensors (for example, eye tracker 710, position sensors 725 and inertial measurement unit 730) as well as audio unit 305 enable a wearer-user of the HMD to conveniently interact with virtual and real-world objects in an augmented reality environment by means of various eye and head movements and positioning and voice commands. In addition, auxiliary devices such as mobile device 765 may provide additional means for user interaction with the augmented reality environment. Similar configurations of virtual-reality headset systems have been commercially available including, for example, systems under the Oculus brand name, such as the Rift and Quest.

In gaming and other entertainment applications, for example, users are often provided with opportunities to purchase content during an augmented-reality experience. These purchases may, for example, be directed to acquiring and/or enhancing virtual object content that is featured as part of the experience, or may relate to real-world items (for example, digital content, e.g., videos, publications, or photographs) that are related to or otherwise promoted as part of the experience. These items may typically be purchases of small value (requiring micropayments), and be made in the midst of a gaming or other experience. As a result, it may be very desirable for users and experience providers that purchases be accomplished rapidly, without substantial system resource consumption, and in some cases without network access to third-party payment and delivery systems.

BRIEF DESCRIPTION OF THE DRAWINGS

A more complete understanding of the present disclosure may be realized in reference to the accompanying drawings in which.

DETAILED DESCRIPTION

Figure 1:
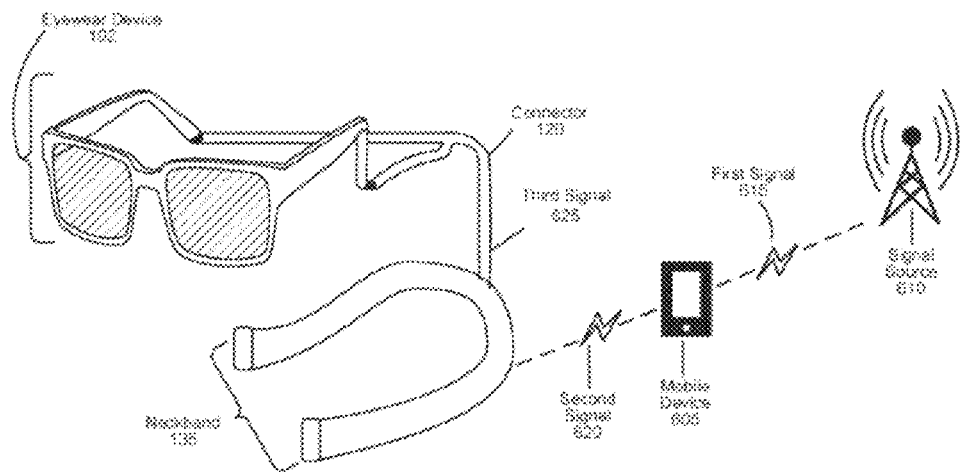
FIG. 1 is a block diagram of a prior art augmented reality system useable with representative aspects of the present disclosure.
Figure 2:
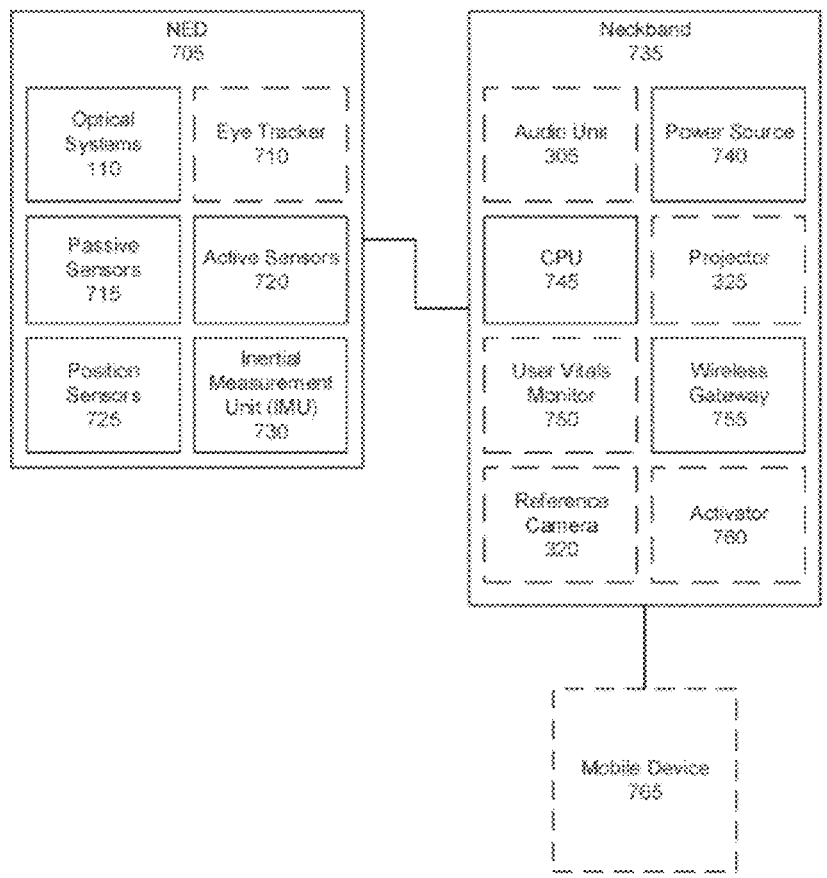
FIG. 2 is a schematic block diagram of HMD useable with the augmented reality system of FIG. 1 and representative aspects of the present disclosure.

The present disclosure is directed to an inventive method for enabling rapid purchase in a virtual and/or augmented-reality transaction system, with limited user interaction, by means of a payment system that supports deferred payment obligations including, for example, without requiring initial account creation or advanced registration of a payment method by the user. Such a deferred payment system is described for example in U.S. Pat. No. 11,170,378 ("Methods for payment and merchant systems"), which issued on Nov. 9, 2021 and is hereby incorporated by reference in its entirety herein. As used herein, a payment system useable with the transaction system of this disclosure may further comprise accessing or maintaining one or more distributed cryptocurrency ledgers, or an electronic wallet of the user's personal device or account including such user's mobile device.

In accordance with the present disclosure, the inventive method begins with an action by the user that indicates the selection of a real or virtual object in the virtual- or augmented-reality, or holographic environment for a potential purchase or rental transaction. Such indication and selection may be performed, for example, by means of at least one of a user's continuous gaze for a predetermined period of time within a region of the item to be selected, signals associated with a pointing device, detected predetermined head motion, hand, finger and/or arm gesture. It should be readily understood that the HMD described herein may be a variety of forms including without limitations, eyeglasses, goggles, or partial helmets or other forms of head gear, having appropriate sensors for making and/or detecting the selection including, but not limited to, for example, forward-facing camera(s), motion and/or gyroscopic sensors in the HMD or external devices associated with the HMD for detecting motion of wearer's head, hands, fingers, arms and/or pointing devices, and cameras and/or sensors for detecting a wearer's gaze.

The potential transaction may be for the purchase of goods and/or services, or rental of same for a predetermined time period including without limitation physical items and digital content. As used herein, digital content includes, for example, videos, video games, images, non-fungible tokens (NFTs), podcasts, publications, music, and unique to the user (or non-unique) digital images to displayed in the virtual environment including virtual clothing, outerwear, headwear, footwear, and jewelry, with or without associated images or avatars of the user, as well as any content communicated in a digital form. In addition, such potential transaction may alternatively be to gain access to digital content from a local or remote content server for a predetermined or unlimited period of time period.

In response to this purchase indication, a transaction management software module causes the HMD to render an advantageous multifunction virtual tool, referred to herein as the "virtual transaction management widget" that is visible to the user. One aspect of the rendered virtual transaction management widget is to preferably provide indications of: (a) a cost of the selected item; (b) a predetermined maximum threshold amount available to be applied to a deferred payment obligation before triggering a payment settlement requirement; and (c) any prior unsettled payment obligations. The transaction management widget tool may optionally further display an accrued credit balance as further described herein.

After presentation of the transaction management widget to the user, a second action by the user is detected, which directs a next stage of the transaction. For example, detection of a predetermined number of head shakes or nods by the user within a predetermined horizontal or vertical angle range over a predetermined period of time in the case that an adequate amount of deferred payment obligation is available to be applied to the purchase may signal the user's intent to proceed with the purchase. Alternatively, the user's intent to proceed may, for example, be signaled by a gaze movement toward an edge of a field of view of the user (for example, a corner of the field of view that displays a shopping cart for this purpose) or a virtual icon in the user's field of view, blinking eyes a preset number of times within a predetermined time period, another predetermined head, hand, finger and/or arm gesture, eye movement or voice command. Such action and interactions by the user may alternatively indicate that a purchase is not intended, or that a purchase just previously made should be undone (the latter action may for example, be made in response to information appearing in or near the transaction management widget that queries whether the purchase is intended to be undone).

In the case of voice commands, an audio unit in the HMD or mobile device may be operative to recognize a voice signal that comprises one or more of a trigger phrase (e.g., "LATERPAY this item") and/or an alias of the mobile device. Prior to recognizing any trigger system, the audio unit may preferably be operative to authenticate/verify the voice signal as authorized by the user.

In case of either of a transaction that is completed or a transaction that is undone, additional information may preferably appear in or near the transaction management widget to confirm that the transaction has been made or has been undone. In a case where communication with the payment system is not available (for example, while the user is playing an augmented reality game offline), the transaction management widget may indicate that a deferred payment purchase is pending until such time as a purchase request has been transmitted to and been approved by the payment system (perhaps only momentarily in the case where communications with the payment system are simply delayed or interrupted). Alternatively, the request may be postponed by the augmented reality system, for example, in situations where the user is deemed to be in a time-sensitive transaction state (for example, making the purchase during a "heat of battle" state in a gaming application).

Once the transaction has been completed, the transaction management widget is preferably updated to indicate the new balance of unsettled deferred payment obligations. When the user reaches a total amount of deterred payment transaction(s) that reaches or exceeds a threshold (for example, a $5.00 threshold for payment transactions), the user may preferably be presented with a transaction management widget indicating that the threshold has been reached, and be provided with access to the payment system through the transaction management widget for the purpose of settling all or a portion of the deferred payment obligation. The threshold may be fixed, or may provide some flexibility to the user (for example, requesting partial settlement when deferred payments total 80% of the threshold, or allowing for an overspend above the threshold on the basis of the user's payment history).

The payment system may provide the user with more than one payment option for this settlement including, for example, paying either by credit card, by Apple Pay, Google Pay, fiat currency, cryptocurrency, permitting third parties to pay the balance, applying accrued credit against such balance, or via an electronic wallet application activated on a suitable device such as an associated mobile device of the user. Alternatively, if the user is unable to carry out the settlement at the requested time, the payment purchase may be made by alternate means (for example, via the credit balance in the wallet application or by permitting third parties to pay the balance). As another alternative, the deferred payment approach may be engaged secondarily only when payment is unavailable via the wallet or other payment application.

Alternatively, the system may allow for the threshold amount to be paid or have been pre-paid by a third party (for example, by a parent of the user). This feature for example may provide an advantageous parental control and/or monitoring mechanism. Parental pre-payments, for example, may be periodically renewed by agreement via a payment means of the parent (for example, via a standing credit card payment replenishment instruction from the parent).

Figure 3:
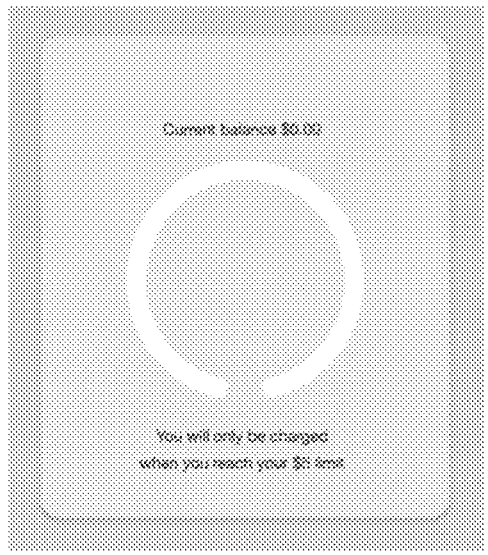
FIGS. 3 through 12 depict representative virtual images created by HMD and visible to a user wearing such HMD in accordance with further aspects of the present disclosure.

FIGS. 3 through 12 provide an exemplary illustration of the deferred payment method as may be implemented in the augmented reality system of the present disclosure. FIG. 3 depicts a representative initial state of the transaction management widget multifunction tool that is produced by the transaction management software module for display in the virtual environment by the HMD worn by a user. The user may advantageously interact with the transaction management widget in accordance with aspects of the deferred payment method of the present disclosure. In FIG. 3, the transaction management widget illustrates no outstanding deferred payments are unsettled ($0.00 balance) by an absence of shading of any portion of an "Omega circle," and optionally by depicted text of "$0.00". The rendered transaction management widget and certain of its various exemplary states will be described in greater detail with respect to an exemplary sequence of transactions by the user illustrated in FIGS. 4 through 12.

Figure 4:
Figure 5:

FIG. 4 depicts an exemplary virtual shirt displayed in the virtual environment for use with, for example, an avatar of the user, which may be of interest for a potential transaction, e.g., purchase, license, or rent, by the user. The user may select the displayed virtual shirt using any of a variety of methods including, for example, the aforementioned pointing devices associated with the HMD; hand, finger and/or arm gestures; and/or by detecting a user's gaze that is directed toward the object for at least a predetermined period of time. Upon selecting such shirt for a potential transaction, the transaction management widget will be displayed for viewing in the HMD such as illustrated in FIG. 5. The representative transaction management widget, displayed in FIG. 5 includes the transaction cost of the depicted virtual shirt, i.e., $1.76, with the Omega circle still displaying no outstanding deferred payments are unsettled ($0.00 balance), and optionally, including instructions for confirming the transaction for the virtual shirt.

Figure 6:
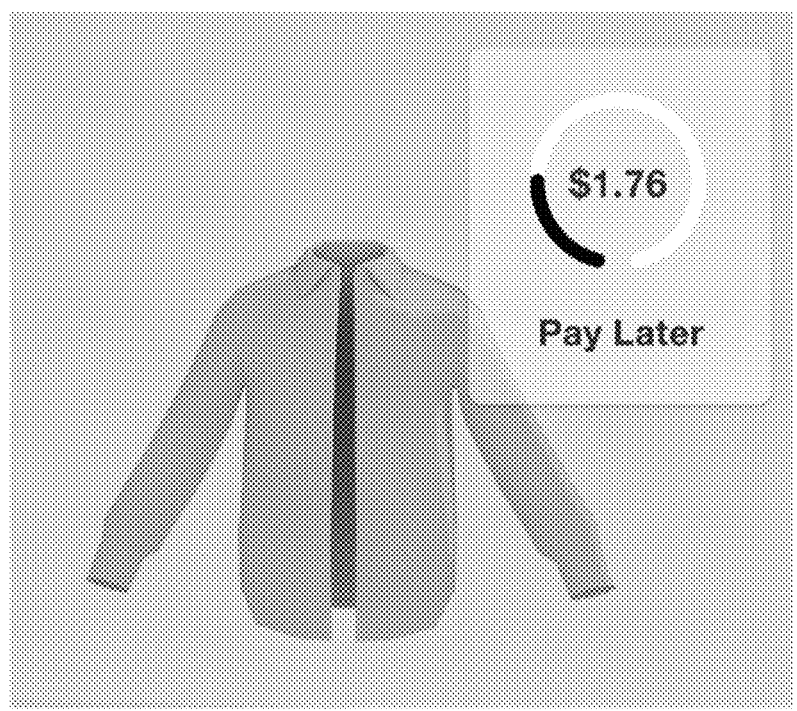

Then, upon the user interacting with the transaction management widget to confirm the transaction for the virtual shirt, the display of the transaction management widget will be updated as shown in FIG. 6 to depict a confirmed deferred payment obligation for the unsettled transaction amount of the virtual shirt of $1.76, by representing the Omega circle with a representative black portion extending from the left-portion end in a clockwise direction to a point proportionately representing $1.76 of the aggregate total permissible $5.00 of deferred payment obligation.

Detection by the augmented reality system of the user's interaction with the transaction management widget, may be in the form of, for example, the sensors associated with the HMD detecting at least one of a predetermined number of head nods by a user within or outside of a predetermined vertical angle range over at least a predetermined period of time, blinking eyes at least a preset number of times within a predetermined time period, predetermined head motion, hand, finger and/or arm gesture, eye movement, pointing device action, and/or voice command. The user may cancel or undo such potential transaction using other ones of the above referenced exemplary interactions with the transaction management widget not used for confirmation of the transaction.

As an aid to the user's interaction with the transaction management widget, an additional time indicator may preferably be displayed, beginning at the start time of the predetermined time interval, within the user's field of vision. The time indicator may indicate a time progression during the time interval, for example by means of a progress bar, countdown timer, a color coding and/or a clock. Updating of the time indicator according to a progression of time, may preferably be provided by a time unit of the HMD and/or mobile device, which may also preferably be operative to remove the time indicator at the end time of the time interval. The time interval may be preferably set to a predetermined constant value, for example such as 5 seconds.

After the transaction is completed, or alternatively, canceled or undone, the transaction management widget may then disappear after an appropriate or preset period of time, and reappear to the user when such user indicates interest in a subsequent potential transaction, or in a permitted recalling of a deferred payment obligation for a prior transaction. In the alternative, the transaction management widget may not disappear, but be relocated to a region of the displayed virtual environment and/or reduced in size for continuously displaying the current balance of the deferred payment obligation.

Figure 7:
Figure 8:
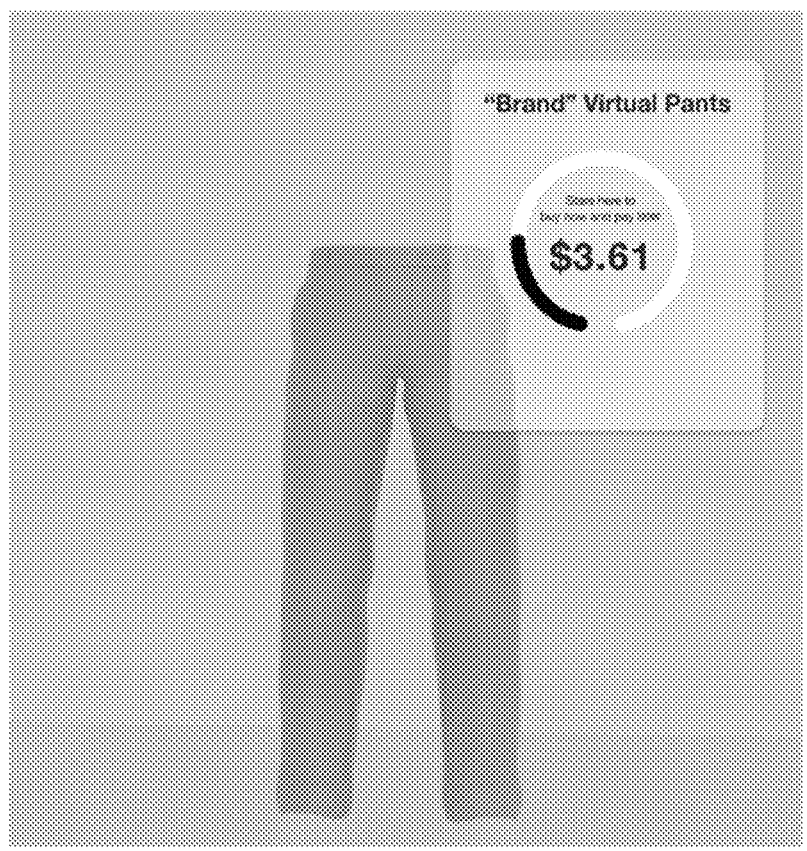

FIG. 7 depicts an exemplary second item, virtual pants, that may be displayed in the virtual environment by the HMD, and which may be of interest to the user for a second potential transaction, e.g., purchase, license, or rent, by the user. The user may select the displayed virtual pant using any of a variety of methods described above with respect to FIG. 4 including, for example, pointing devices associated with the HMD; hand, finger and/or arm gestures; and/or by detecting a user's gaze that is directed toward the object for at least a predetermined period of time. Upon selecting the virtual pants for a potential transaction, the transaction management widget, will be displayed in the virtual environment by the HMD such as illustrated in FIG. 8. The representative transaction management widget displayed in FIG. 8 includes the transaction cost of the depicted virtual pants, i.e., $3.61, with the Omega circle still displaying the balance of $1.76 for the deferred payment obligation by representing the Omega circle with the respective black proportionally indicating such an amount relative to the aggregate maximum permissible deferred payment obligation of $5.00. Also in FIG. 8, the displayed transaction management widget optionally includes instructions for confirming the transaction for the virtual pants.

Figure 9:
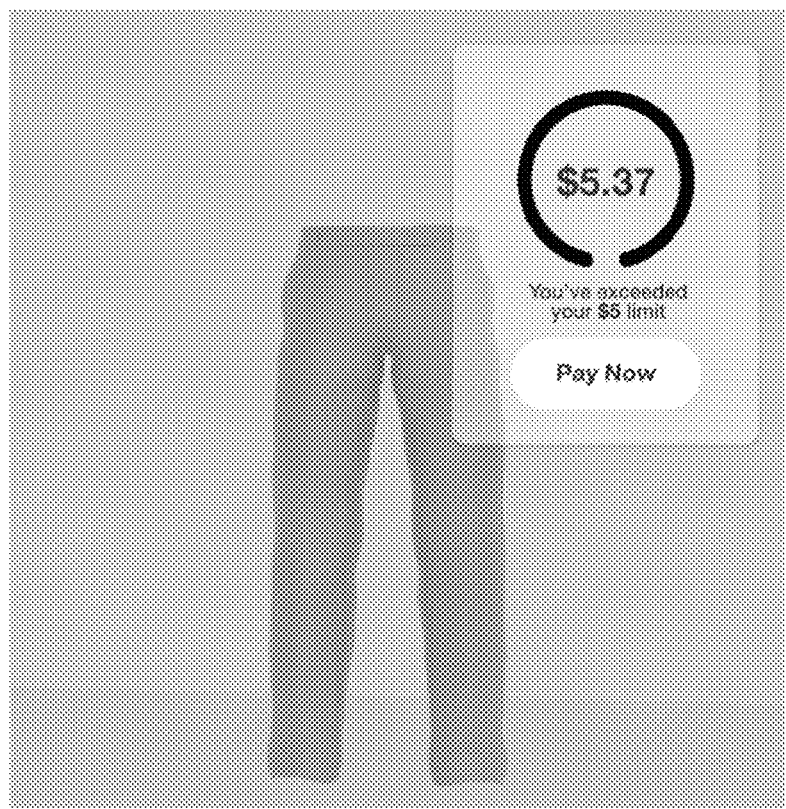

Upon the user interacting with the transaction management widget to confirm the transaction for the virtual pants, the display of the transaction management widget will be updated, as shown in FIG. 9 to depict a deferred payment obligation for the unsettled total aggregate transaction amount of $5.37, i.e., the cumulative transactions amounts owed for the transactions of the virtual shirt and the virtual pants, with the black are fully extending around the Omega circle. Thus, as illustrated, an overspend of $0.37 beyond that $5.00 threshold has been allowed. Because the unsettled total aggregate transaction amount of $5.37 exceeds the aggregate maximum permissible deferred payment obligation of $5.00, the transaction management widget of FIG. 9 further displays that "You've filled your $5.00", and a selectable option to "Pay Now" to enable the user to easily communicate with the payment system for settlement. If the user does not select the "Pay Now" option or indicate cancelation of the potential transaction, the transaction for virtual pants will not be completed.

Further, to the extent that such deferred payment obligation is not settled, the transaction management widget, and or/the virtual or augmented reality system may preferably provide a visual and/or audio alert to the user that until such payment obligation is settled, the user will not be provided access to the payment system and will be unable to enter transactions for other goods, services, and digital content via any of the augmented- or virtual-reality, or holographic platforms, operating systems or websites supported by such payment system.

Figure 10:
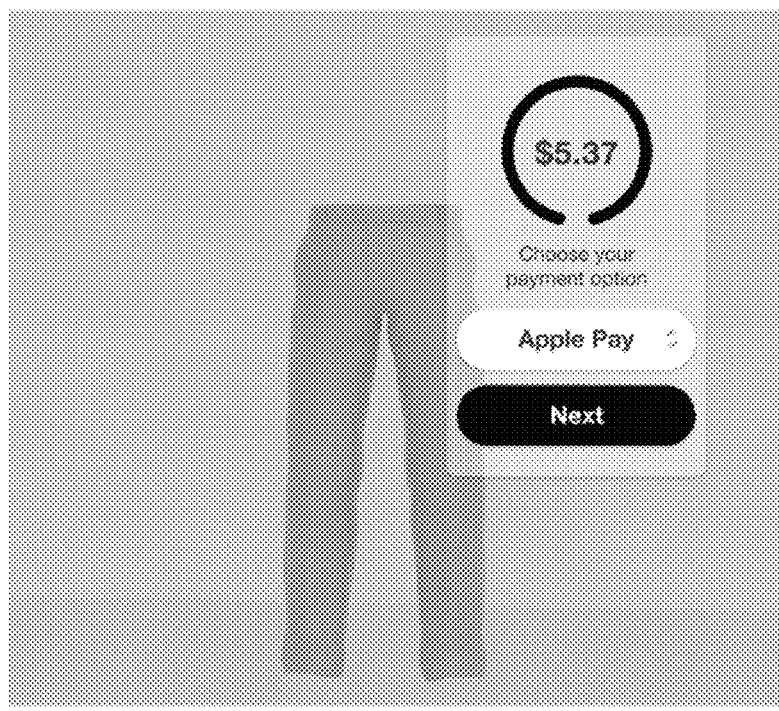
Figure 11:
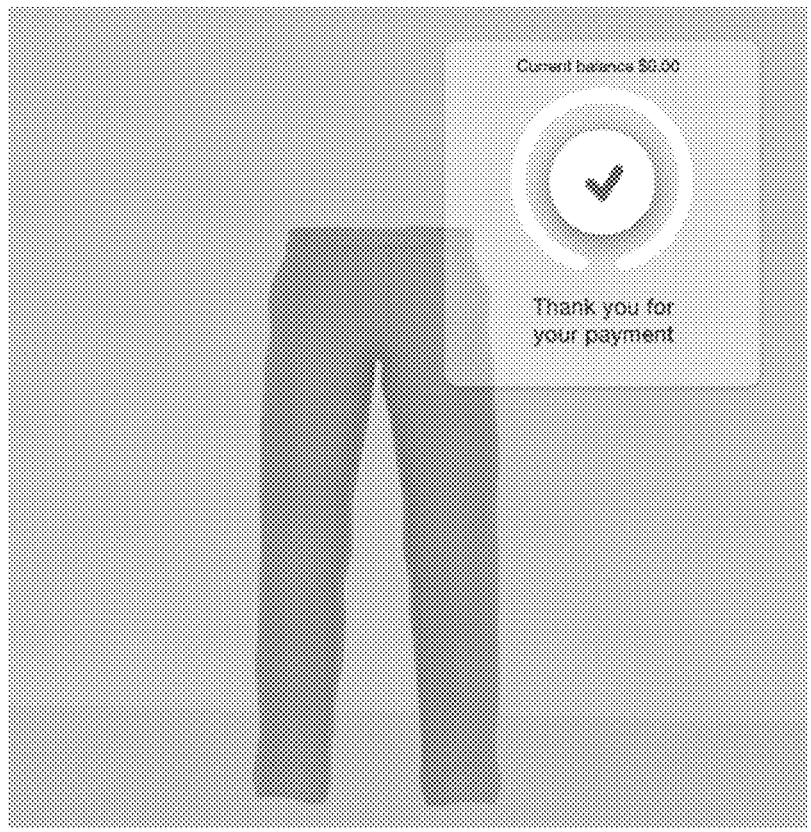

Referring again to FIG. 9, upon the user selecting the selection "Pay Now" option, the exemplary transaction management widget is updated to that shown in FIG. 10 with a representative selectable one or more user interaction options, e.g., "Apple Pay", for settlement. Upon selecting the Apple Pay payment option, the user will be able to pay her/his deferred payment obligation of $5.37. It should be understood that such payment options may include one or more payment options described above including credit card, by Apple Pay (as shown), Google Pay, fiat currency, cryptocurrency, permitting third parties to pay the balance, applying accrued credit against such balance, or via an electronic wallet application activated on suitable device such as an associated mobile device of the user. Once the user has paid the $5.37 payment obligation, the transaction management widget may be updated to reflect or confirm such payment as depicted, for example, in FIG. 11.

The use of the transaction management widget rendered by the transaction management software module in accordance with this disclosure not only enables users to quickly execute transactions with deferred payment, but also may reflect, for example, credit or discount provided to or earned by the user by depicting a corresponding segment of the Omega circle in a different color, pattern or shading, or outline of such segment highlighted in in a different color, pattern or shading. In a similar manner, a voucher provided to or earned by the user, for example, for engaging in an activity in the virtual environment, may be reflected in the Omega circle in a like manner, with or without an indicator regarding the physical or virtual item or service for which such voucher may be used. Such voucher may further reflect without limitation, earned credit and/or discount for a product, video game service, and access to event such as a concert, theatrical play, sports event, museum, gallery, or tour of a physical or virtual museum or zoo. One particular example includes earning such voucher engaging in an activity in the virtual environment for the earned credit or discount useable in the real world for products and/or activities including, for example, receiving a service, or attending a concert, sports event, theatrical play, or tour.

Figure 12:
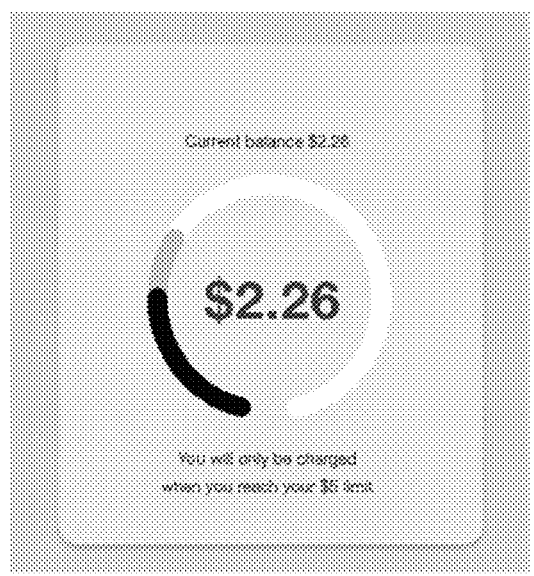

FIG. 12, shows a transaction management widget advantageously depicting an "Omega circle" (representing a $1.76 deferred payment obligation) with a pending deferred payment obligation is indicated by a gray arc extending away from the black arc in a clockwise direction for purchases made offline or during the period of time required for the deferred payment obligation to be accepted for the corresponding confirmed transaction. While the illustrated transaction management widget in the figures is illustrated in the form of an Omega circle and U.S. dollar amounts, these also may be presented with alternate symbols including, for example, indicators of other shapes, such as bar(s) inclined or declined lines, and other currency amounts.

The invention is further described by the following numbered paragraphs:

1. A computer-implemented method for an augmented-reality transaction system for enabling rapid transactions with deferred payment obligation with limited user interaction comprising the steps of:
   establishing a data connection between a device and a network-accessible payment system, the device being configured to be worn on a head of a user, the device including one or more image-forming components configured to generate light rays to form images of virtual content, the one or more image-forming components being configured to present the images to the user and superimpose the images over views of a real-world environment to create an interactive space such that the virtual content is perceived to be present in the real-world environment, the device further including sensors to detect at least one of a user gazes at items in the real-world environment and virtual items, blinking, head motion, pointing devices, hand, finger and/or arm gestures and voice commands;
   obtaining first information from the device of an item selected in the real-world environment or indicated virtual content for a potential transaction based on first signals from at least one of said device sensors;
   causing the device to generate virtual content of a transaction management widget in response to obtaining the first information, the transaction management widget indicating statuses of (a) a cost of the selected item; (b) a predetermined maximum threshold amount before triggering a payment settlement requirement; and (c) any prior unsettled payment obligations;
   obtaining second information from the device indicating a particular interaction by the user with at least one of the transaction management widget or another item in the virtual space associated with the transaction management widget, said second information indicating at least one of confirming or canceling the potential transaction of the selected item based on second signals from at least one of the device sensors;
   causing the device to update the virtual content of the transaction management widget in accordance with the obtained second information;
   transmitting a transaction authorization signal to a network-accessible merchant offering the selected item without concurrently requiring payment for the transaction, when the total of the cost of the selected item and any prior unsettled payment obligations are less than the predetermined maximum of aggregate payment obligations; and
   transmitting a signal to the payment system for settlement of at least a part of a total outstanding balance when a combination of the cost of the selected item and any prior unsettled payment obligations equal or are greater than the predetermined maximum threshold amount, receiving a settlement signal from the payment system that payment has been received; and causing the device to update the virtual content of the transaction management widget to reflect the amount settled reflected by the received settlement signal.

2. The method of paragraph 1, wherein the first information of a selected item is based on the first signals indicative of at least one of a user's continuous gaze for a predetermined period of time within a region of the item to be selected, signals associated with a pointing device, detected predetermined head motion, hand, finger and/or arm gesture.

3. The method of paragraph 1, wherein the second signals from at least one said device sensors indicates confirmation of the transaction of the selected item based on the detection of at least one of a predetermined number of head nods by a user within a predetermined vertical angle range over a predetermined period of time, blinking eyes a preset number of times within a predetermined time period, predetermined head motion, hand, finger and/or arm gesture, eye movement, pointing device action, and voice command.

4. The method of paragraph 1, wherein the second signals from at least one said device sensors indicates canceling the transaction of the selected item based on the detection of at least one of a predetermined number of head shakes by a user within a predetermined horizontal angle range over a predetermined period of time, blinking eyes a preset number of times within a predetermined time period, predetermined head motion, hand, finger and/or arm gesture, eye movement, pointing device action, and voice command.

5. The method of paragraph 1, further comprising a step of undoing a transaction of a selected item when third information is obtained from the device based on the sensor signals being indicative of an undoing command.

6. The method of paragraph 1, further comprising the steps of:
   transmitting a transaction authorization signal to the network-accessible merchant offering the selected item without concurrently requiring payment for the transaction, when the total of the cost of the selected item and any prior unsettled payment obligations are equal to or greater than the predetermined maximum threshold amount, when communication with the payment system cannot be established; and
   upon establishment of communications with the payment system thereafter, performing the step of transmitting the signal to the payment system for settlement of at least a part of a total outstanding balance.

7. The method of paragraph 1, further comprising the steps of:
   transmitting a transaction authorization signal to the network-accessible merchant offering the selected item without concurrently requiring payment for the transaction, when the total of the cost of the selected item and any prior unsettled payment obligations are equal to or greater than the predetermined maximum threshold amount, when such transaction occurs when such device is a time-sensitive transaction state; and
   performing the step of transmitting the signal to the payment system for settlement of at least a part of a total outstanding balance, when the device is no longer in the time-sensitive transaction state.

8. The method of paragraph 1, wherein the payment system includes at least one of a network-accessible payment service provider, cryptocurrency ledger and an electronic wallet associated with the user.

9. The method of paragraph 1, wherein the transaction is either for a purchase, rental or access associated with the selected item.

10. The method of paragraph 1, wherein the transaction is either for a purchase or rental of goods and/or services of at least one of physical items and digital content.

11. The method of paragraph 1, wherein the transaction management widget further indicates at least one of a credit amount, discount and/or voucher.

12. The method of paragraph 11 wherein the voucher is for earned credit or discount for at least one of a physical product and digital content.

13. The method of paragraph 12 wherein the voucher was earned for engaging in an activity in the virtual environment and the earned credit or discount is for the at least one of a physical product and digital content of a video, music, video game, service, or access to a concert, sports event, theatrical play, museum, gallery, or tour in the real world.

14. A computer-implemented method for a virtual-reality transaction system for enabling rapid transactions with deferred payment obligation with limited user interaction comprising the steps of:
    establishing a data connection between a device and a network-accessible payment system, the device being configured to be worn on a head of a user, the device including one or more image-forming components configured to generate light rays to form images of virtual content in a virtual environment, the device further including sensors to detect at least one of a user gazes at virtual items in the virtual environment, blinking, head motions, pointing devices, hand, finger and/or arm gestures and voice commands;
    obtaining first information from the device of an item selected indicated virtual content for a potential transaction based on first signals from at least one of said device sensors;
    causing the device to generate virtual content of a transaction management widget in response to obtaining the first information, the transaction management widget indicating statuses of (a) a cost of the selected item; (b) predetermined maximum threshold amount before triggering a payment settlement requirement; and (c) any prior unsettled payment obligations;
    obtaining second information from the device indicating a particular interaction by the user with at least one of the transaction management widget or another item in the virtual space associated with the transaction management widget, said second information indicating at least one of confirming or canceling the potential transaction of the selected item based on second signals from at least one of the device sensors;
    causing the device to update the virtual content of the transaction management widget in accordance with the obtained second information;
    transmitting a transaction authorization signal to a network-accessible merchant offering the selected item without concurrently requiring payment for the transaction, when the total of the cost of the selected item and any prior unsettled payment obligations are less than the predetermined maximum of aggregate payment obligations; and
    transmitting a signal to the payment system for settlement of at least a part of a total outstanding balance when a combination of the cost of the selected item and any prior unsettled payment obligations equal or are greater than the predetermined maximum threshold amount, receiving a settlement signal from the payment system that payment has been received, and causing the device to update the virtual content of the transaction management widget to reflect the amount settled reflected by the received settlement signal.

15. The method of paragraph 14, wherein the first information of a selected item is based on the first signals are indicative of at least one of a user's continuous gaze for a predetermined period of time within a region of the item to be selected, signals associated pointing devices, predetermined head motion, hand, finger and/or arm gesture.

16. The method of paragraph 14, wherein the second signals from at least one said device sensors indicates confirmation of the transaction of the selected item based on the detection of at least one of a predetermined number of head nods by a user within a predetermined vertical angle range over a predetermined period of time, blinking eyes a preset number of times within a predetermined time period, predetermined head motion, hand, finger and/or arm gesture, eye movement or voice command.

17. The method of paragraph 14, wherein the second signals from at least one said device sensors indicates canceling the transaction of the selected item based on the detection of at least one of a predetermined number of head shakes by a user within a predetermined horizontal angle range over a predetermined period of time, blinking eyes a preset number of times within a predetermined time period, predetermined head motion, hand, finger and/or arm gesture, eye movement or voice command.

18. The method of paragraph 14, further comprising a step of undoing a transaction of a selected item when third information is obtained from the device based on the sensor signals being indicative of an undoing command.

19. The method of paragraph 14, further comprising the steps of:
    transmitting a transaction authorization signal to the network-accessible merchant offering the selected item without concurrently requiring payment for the transaction, when the total of the cost of the selected item and any prior unsettled payment obligations are equal to or greater than the predetermined maximum threshold amount, when communication with the payment system cannot be established; and
    upon establishment of communications with the payment system thereafter, performing the step of transmitting the signal to the payment system for settlement of at least a part of a total outstanding balance.

20. The method of paragraph 14, further comprising the steps of:
    transmitting a transaction authorization signal to the network-accessible merchant offering the selected item without concurrently requiring payment for the transaction, when the total of the cost of the selected item and any prior unsettled payment obligations are equal to or greater than the predetermined maximum threshold amount, when such transaction occurs when such device is a time-sensitive transaction state; and
    performing the step of transmitting the signal to the payment system for settlement of at least a part of a total outstanding balance, when the device is no longer in the time-sensitive transaction state.

21. The method of paragraph 14, wherein the payment system includes at least one of a network-accessible payment service provider, cryptocurrency ledger, and an electronic wallet associated with the user.

22. The method of paragraph 14, wherein the transaction is either for a purchase, rental or access, associated with the selected item.

23. The method of paragraph 14, wherein the transaction is either for a purchase or rental of, or access to goods and/or services of at least one of physical items, and digital content.

24. The method of paragraph 14, wherein the transaction management widget further indicates at least one of a credit amount, discount and/or voucher.

25. The method of paragraph 24 wherein the voucher is for earned credit and/or discount for at least one of a physical product or digital content.

26. The method of paragraph 25 wherein the voucher was earned for engaging in an activity in the virtual environment and the earned credit and/or discount is for the at least one of a physical product and digital content of a video, music, service, and access to a concert, sports event, theatrical play, museum, gallery, or tour in the real world.

27. A computer-implemented method for enabling purchases related to an augmented-reality environment provided by an AR device and/or an AR backend, the AR device having at least one display and at least one sensor, preferably an eye tracker, position sensor and/or inertial measurement unit, the method comprising the steps of:
visualizing a purchase incentive in the augmented reality environment, in particular by using the display;
obtaining selection data based on first signals from the at least one sensor, the selection data being indicative of an item, in particular a virtual content item and/or a real-world item, selected for purchase;
obtaining reaction data based on second signals from the at least one sensor, the second signals being acquired continuously during a time interval;
evaluating the reaction data to either confirm or cancel the purchase of the selected item;
assigning pricing data and payment data to the selected item, in particular by performing a database look-up;
if the purchase is confirmed, transmitting pricing data and/or payment data to a payment system to initiate a payment of the selected item.

28. The method according to paragraph 27, characterized in that the purchase is confirmed if at least a part of the reaction data is indicative of
a user's gaze to a region in the augmented reality environment, preferably indicated by sensor signals of the eye tracker;
a user's position in a region in the augmented reality environment, preferable indicated by sensor signals of the position sensor and/or the inertial measurement unit; and/or
a predetermined number of nods by the user, preferably indicated by sensor signals of the inertial measurement unit;

29. The method according to any of the preceding paragraphs beginning with paragraph 27, characterized in that the purchase is cancelled if at least a part of the reaction data is indicative of a predetermined number of headshakes by the user, preferably indicated by sensor signals of the inertial measurement unit.

30. The method according to any of the preceding paragraphs beginning with paragraph 27, in particular paragraph 28, characterized in that the method further comprises the step of
visualizing a time progression during the time interval in the augmented reality environment, in particular by means of a progress bar, countdown timer, a color coding and/or clock.

31. The method according to any of the preceding paragraphs beginning with paragraph 27, characterized in that the method further comprises:
storing a start time of the time interval in reaction to or triggered by at least one of the first signals;
determining an end time of the time interval, preferably such that the difference between the end time and the start time equals a predetermined constant, preferably less than 5 sec.

32. The method according to any of the preceding paragraphs beginning with paragraph 27, in particular paragraphs 30-31, characterized in that visualizing the time progression comprises one or more of the following steps:
Displaying a time indicator at the start time of the time interval, in particular using the display;
Updating the time indicator according to a progression of time, preferably provided by a time unit of the VR device;
Removing the time indicator at the end time of the time interval;

33. The method according to any of the preceding paragraphs beginning with paragraph 27, characterized in that the payment system is adapted to perform a payment transaction from a user such that payment is only required if the total cost of an item cost, according to the pricing data, and a total of unsettled prior obligations associated with the user exceeds a threshold amount.

34. The method according to any of the preceding paragraphs beginning with paragraph 27, in particular paragraph 33, characterized in that a transaction management widget is displayed in the augmented reality environment, the transaction management widget indicating at least one of:
the pricing data of the selected item;
the threshold amount before the payment system requires a payment;
unsettled prior obligations, if existing.

35. A computer-implemented method, in particular according to any of the preceding paragraphs beginning with paragraph 27, for enabling purchases related to an augmented-reality environment provided by an AR device and/or an AR backend, the AR device having at least one display and at least one sensor, preferably an eye tracker, position sensor and/or inertial measurement unit, the method comprising the steps of:
receiving, by a mobile device, a trigger signal, in particular a audio signal, the trigger signal being indicative of a user's purchase intention;
identifying, by the mobile device, at least one item related to the purchase intention, in particular by sending at least one request to the VR device and/or the VR backend;
assigning pricing data and payment data to the identified item, in particular by performing a database look-up;
transmitting, by the mobile device, pricing data and/or payment data to a payment system to initiate a payment of the selected item.

36. The method according to any of the preceding paragraphs beginning with paragraph 27, in particular paragraph 35, characterized in that the identifying of the at least one item related to the purchase intention comprises:
sending, by the mobile device, a request to the VR device and/or to the VR backend, comprising identification data and data related to the purchase intention;
relating, by the VR device and/or the VR backend, the request to an avatar in the augmented reality environment, the avatar being associated with the identification data;
determining, by the VR device and/or the VR backend, at least one item using the data related to the purchase information and at least one property oldie avatar.

37. The method according to any of the preceding paragraphs beginning with paragraph 27, in particular paragraphs 35-36, wherein the at least one property of the avatar corresponds to
- a user's gaze to a region in the augmented reality environment, preferably indicated by sensor signals of an eye tracker; and/or
- a user's position in a region in the augmented reality environment, preferable indicated by sensor signals of the position sensor and/or inertial measurement unit.

38. The method according to any of the preceding paragraphs beginning with paragraph 27, in particular paragraphs 35-37, wherein the trigger signal is a voice signal and the method further comprises the step of
- verifying authenticity of the voice signal.

39. The method according to any of the preceding paragraphs beginning with paragraph 27, in particular paragraphs 35-38, wherein the trigger signal is a voice signal comprising a trigger phrase and/or an alias of the mobile device.

40. The method according to any of the preceding paragraphs beginning with paragraph 27, in particular paragraphs 35-39, characterized in that the method further comprises the step of:
- selecting, by the mobile device, a payment system out of a plurality of payment systems, in particular using the pricing data and/or payment data;

41. The method according to any of the preceding paragraphs beginning with paragraph 27, in particular paragraphs 35-40, characterized in that the method further comprises the step of:
- Transmitting description data related to the identified item by the mobile device to the VR device;
- Visualizing the description data by the VR device, in particular by using the display;
- Evaluating, by the VR device, reaction data based on third signals from the at least one sensor to confirm or cancel the purchase of the selected item.

42. A computer readable medium storing instructions that when executed by at least one processor cause the at least one processor to implement a method according to any of the preceding paragraphs beginning with paragraph 27.

43. A VR device comprising a computer readable medium according to paragraph 42.

44. A system for enabling purchases related to an augmented-reality environment, the system comprising:
- an AR device having at least one display and at least one sensor, preferably an eye tracker, position sensor and/or inertial measurement unit;
- an AR backend;
- at least one payment system, wherein an augmented reality environment is provided by the AR device and/or the AR backend, wherein the AR device is configured to visualize a purchase incentive, in particular by using the display, in the augmented reality environment and the AR backend is configured to at least one of the following:
- obtaining selection data based on first signals from the at least one sensor, the selection data being indicative of an item selected for purchase;
- obtaining reaction data based on second signals from the at least one sensor, the second signals being acquired continuously during a time interval;
- evaluating the reaction data to either confirm or cancel the purchase of the selected item;
- assigning pricing data and payment data to the selected item, in particular by performing a database look-up;
- if the purchase is confirmed, transmitting pricing data and/or payment data to a payment system to initiate a payment of the selected item.

45. The system according to paragraph 44, characterized in that the system further comprises a mobile device, in particular a smartphone or a smart speaker, configured to at least one of the following:
- receiving a trigger signal, in particular a voice signal, from the AR device, the trigger signal being indicative of a user's purchase intention;
- identifying at least one item related to the purchase intention, in particular by sending at least one request to the VR device and/or the VR backend;
- assigning pricing data and payment data to the identified item, in particular by performing a database look-up;
- transmitting pricing data and/or payment data to a payment system to initiate a payment of the selected item.

By implementing the advantageous unique virtual transaction management widget multifunction tool and enabling a user to interact with such image indicator in connection with the selection of a real or virtual object in the virtual- or augmented-reality environment for a potential purchase, rental or access transaction, the transaction systems in accordance with this disclosure beneficially enable rapid transactions including confirmation of such transactions have deferred payment obligations with limited user interaction. Such transactions systems and methods therefor are particularly advantageous for micropayment transactions in the virtual environment.

It will be understood that, while various aspects Utile present disclosure have been illustrated and described by way of example, the invention described herein is not limited thereto, but may be otherwise variously embodied as suggested by the disclosure and as indicated within the scope of the following exemplary claims. For example, although the disclosure describes the inventive methods of the transaction systems for enabling rapid transactions with deferred payment obligation and limited user interaction with regard to a virtual-reality HMD and system, such inventively may additionally be implemented in an augmented-reality or holographic system, or the like.

The invention claimed is:

1. A computer-implemented method for an augmented-reality transaction system for enabling rapid transactions with deferred payment obligation with limited user interaction comprising the steps of:
- establishing a data connection between a head-mounted display ("HMD") device and a network-accessible payment system, the HMD device being configured to be worn on a head of a user, the HMD device including one or more image-forming components configured to generate light rays to form and display images of virtual content, the one or more image-forming components being configured to present the images to the user and superimpose the images over views of a real-world environment to create an interactive space such that the virtual content is perceived to be present in the real-world environment, the HMD device further including sensors to detect at least one of a user gazes at items in the real-world environment and virtual items, blinking, head motion, and voice commands;
- obtaining first information from the HMD device of an item selected in the real-world environment or indicated virtual content for a potential transaction based on first signals from at least one of said HMD device sensors or one or more auxiliary user devices operable by hand, finger or arm gestures of the user;

causing the HMD device to generate and display a virtual content image of a transaction status indicator ("TSI") in response to obtaining the first information, the TSI indicating statuses of (a) a cost of the selected item; (b) a predetermined maximum cost threshold amount triggering a payment settlement requirement for the user; and (c) an expended cost amount representing prior unsettled payment obligations;

obtaining second information from the at least one sensor of the HMD device while the TSI is displayed, the second information indicating a particular interaction by the user with the HMD that has been detected by the one or more sensors, the interaction indicated by one or more of the user gazing at at least one of the TSI or another item in the virtual space associated with the TSI, the user blinking, or the user making head motions, said second information indicating at least one of confirming or canceling the potential transaction of the selected item;

causing the HMD device after obtaining the second information to generate and display a countdown time indicator that operates over a predetermined time interval;

causing the HMD device to update the virtual content of the TSI in accordance with the obtained second information;

determining from the second information whether the user interaction with the HMD device is continuous for at least the predetermined time interval;

transmitting, when the user interaction with the HMD device is continuous for at least the predetermined time interval, a transaction authorization signal to a network-accessible merchant offering the selected item without concurrently requiring payment for the transaction, when the total of the cost of the selected item and any prior unsettled payment obligations are less than the predetermined maximum of aggregate payment obligations; and transmitting a signal to the payment system for settlement of at least a part of a total outstanding balance when a combination of the cost of the selected item and any prior unsettled payment obligations equal or are greater than the predetermined maximum threshold amount, receiving a settlement signal from the payment system that payment has been received; and causing the HMD device to update the virtual content of the TSI to reflect the amount settled reflected by the received settlement signal.

2. The method of claim 1, wherein the first information of a selected item is based on the first signals indicative of at least one of a user's continuous gaze for a predetermined period of time within a region of the item to be selected, signals associated with a pointing device, detected predetermined head motion, hand, finger and/or arm gesture.

3. The method of claim 1, wherein the second signals from at least one said device sensors indicates confirmation of the transaction of the selected item based on the detection of at least one of a predetermined number of head nods by a user within a predetermined vertical angle range over a predetermined period of time, blinking eyes a preset number of times within a predetermined time period, predetermined head motion, and eye movement.

4. The method of claim 1, wherein the second signals from at least one said device sensors indicates canceling the transaction of the selected item based on the detection of at least one of a predetermined number of head shakes by a user within a predetermined horizontal angle range over a predetermined period of time, blinking eyes a preset number of times within a predetermined time period, predetermined head motion, and eye movement.

5. The method of claim 1, further comprising a step of undoing a transaction of a selected item when third information is obtained from the HMD device based on the sensor signals being indicative of an undoing command.

6. The method of claim 1, further comprising the steps of:
transmitting a transaction authorization signal to the network-accessible merchant offering the selected item without concurrently requiring payment for the transaction, when the total of the cost of the selected item and any prior unsettled payment obligations are equal to or greater than the predetermined maximum threshold amount, when communication with the payment system cannot be established; and upon establishment of communications with the payment system thereafter, performing the step of transmitting the signal to the payment system for settlement of at least a part of a total outstanding balance.

7. The method of claim 1, further comprising the steps of:
transmitting a transaction authorization signal to the network-accessible merchant offering the selected item without concurrently requiring payment for the transaction, when the total of the cost of the selected item and any prior unsettled payment obligations are equal to or greater than the predetermined maximum threshold amount, when such transaction occurs when such HMD device is a time-sensitive transaction state; and performing the step of transmitting the signal to the payment system for settlement of at least a part of a total outstanding balance, when the device is no longer in the time-sensitive transaction state.

8. The method of claim 1, wherein the payment system includes at least one of a network-accessible payment service provider, cryptocurrency ledger and an electronic wallet associated with the user.

9. The method of claim 1, wherein the transaction is either for a purchase, rental or access associated with the selected item.

10. The method of claim 1, wherein the transaction is either for a purchase or rental of goods and/or services of at least one of physical items, digital items, publications, music, and digital images to displayed in the virtual environment.

11. The method of claim 1, wherein the TSI further indicates at least one of a credit amount or voucher.

12. The method of claim 11 wherein the voucher is for earned credit and/or discount for at least one of a product, video game, service, or access to a concert, sports event, theatrical play, museum, gallery, or tour.

13. The method of claim 12 wherein the voucher was earned for engaging in an activity in the virtual environment and the earned credit and/or discount is for the at least one of a product, video game, service, or access to a concert, sports event, theatrical play, museum, gallery, or tour in the real world.

14. A computer-implemented method for a virtual-reality transaction system for enabling rapid transactions with deferred payment obligation with limited user interaction comprising the steps of:
establishing a data connection between a head-mounted display ("HMD") device and a network-accessible payment system, the device being configured to be worn on a head of a user, the HMD device including one or more image-forming components configured to generate light rays to form and display images of virtual content in a virtual environment, the HMD device further including sensors to detect at least one of a user gazes at virtual items in the virtual environment, blinking, head motions, and voice commands;

obtaining first information from the HMD device of an item selected indicated virtual content for a potential transaction based on first signals from at least one of said HMD device sensors or one or more auxiliary user devices operable by hand, finger or arm gestures of the user;

causing the HMD device to generate and display virtual content image of a transaction status indicator ("TSI") in response to obtaining the first information, the TSI indicating statuses of (a) a cost of the selected item; (b) a predetermined maximum threshold amount triggering a payment settlement requirement for the user; and (c) an expended cost amount representing prior unsettled payment obligations;

obtaining second information from the at least one sensor of the HMD device while the TSI is displayed, the second information indicating a particular interaction by the user with the HMD that has been detected by the one or more sensors, the interaction indicated by one or more of the user gazing at at least one of the TSI or another item in the virtual space associated with the TSI, the user blinking, or the user making head motions, said second information indicating at least one of confirming or canceling the potential transaction of the selected item;

causing the HMD device after obtaining the second information to generate and display a countdown time indicator that operates over a predetermined time interval;

causing the HMD device to update the virtual content of the TSI in accordance with the obtained second information;

determining from the second information whether the user interaction with the HMD device is continuous for at least the predetermined time interval;

transmitting, when the user interaction with the HMD device is continuous for at least the predetermined time interval, a transaction authorization signal to a network-accessible merchant offering the selected item without concurrently requiring payment for the transaction, when the total of the cost of the selected item and any prior unsettled payment obligations are less than the predetermined maximum of aggregate payment obligations; and transmitting a signal to the payment system for settlement of at least a part of a total outstanding balance when a combination of the cost of the selected item and any prior unsettled payment obligations equal or are greater than the predetermined maximum threshold amount, receiving a settlement signal from the payment system that payment has been received, and causing the device to update the virtual content of the TSI to reflect the amount settled reflected by the received settlement signal.

15. The method of claim 14, wherein the first information of a selected item is based on the first signals are indicative of at least one of a user's continuous gaze for a predetermined period of time within a region of the item to be selected, signals associated pointing devices, predetermined head motion, hand, finger and/or arm gesture.

16. The method of claim 14, wherein the second signals from at least one said device sensors indicates confirmation of the transaction of the selected item based on the detection of at least one of a predetermined number of head nods by a user within a predetermined vertical angle range over a predetermined period of time, blinking eyes a preset number of times within a predetermined time period, predetermined or eye movement.

17. The method of claim 14, wherein the second signals from at least one said device sensors indicates canceling the transaction of the selected item based on the detection of at least one of a predetermined number of head shakes by a user within a predetermined horizontal angle range over a predetermined period of time, blinking eyes a preset number of times within a predetermined time period, predetermined head motion, or eye movement.

18. The method of claim 14, further comprising a step of undoing a transaction of a selected item when third information is obtained from the HMD device based on the sensor signals being indicative of an undoing command.

19. The method of claim 14, further comprising the steps of:
transmitting a transaction authorization signal to the network-accessible merchant offering the selected item without concurrently requiring payment for the transaction, when the total of the cost of the selected item and any prior unsettled payment obligations are equal to or greater than the predetermined maximum threshold amount, when communication with the payment system cannot be established; and
upon establishment of communications with the payment system thereafter, performing the step of transmitting the signal to the payment system for settlement of at least a part of a total outstanding balance.

20. The method of claim 14, further comprising the steps of:
transmitting a transaction authorization signal to the network-accessible merchant offering the selected item without concurrently requiring payment for the transaction, when the total of the cost of the selected item and any prior unsettled payment obligations are equal to or greater than the predetermined maximum threshold amount, when such transaction occurs when such HMD device is a time-sensitive transaction state; and
performing the step of transmitting the signal to the payment system for settlement of at least a part of a total outstanding balance, when the device is no longer in the time-sensitive transaction state.

21. The method of claim 14, wherein the payment system includes at least one of a network-accessible payment service provider, cryptocurrency ledger, and an electronic wallet associated with the user.

22. The method of claim 14, wherein the transaction is either for a purchase, rental or access, associated with the selected item.

23. The method of claim 14, wherein the transaction is either for a purchase or rental of, or access to goods and/or services of at least one of physical items, digital items, publications, music, and/or digital images to displayed in the virtual environment.

24. The method of claim 14, wherein the TSI further indicates at least one of a credit amount, discount and/or voucher.

25. The method of claim 24 wherein the voucher is for earned credit and/or discount for at least one of a product, video game, service, and/or access to a concert, sports event, theatrical play, museum, gallery, or tour.

26. The method of claim 25 wherein the voucher was earned for engaging in an activity in the virtual environment and the earned credit and/or discount is for the at least one of a product, video game, service, and/or access to a concert, sports event, theatrical play, museum, gallery, or tour in the real world.

\* \* \* \* \*